United States Patent
Danilov et al.

(10) Patent No.: US 11,347,746 B2
(45) Date of Patent: May 31, 2022

(54) EFFICIENT ROLLING TRANSACTIONS IN A DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 16/796,450

(22) Filed: Feb. 20, 2020

(65) Prior Publication Data
US 2021/0263937 A1 Aug. 26, 2021

(51) Int. Cl.
*G06F 16/00* (2019.01)
*G06F 16/2455* (2019.01)
*G06F 7/14* (2006.01)

(52) U.S. Cl.
CPC .......... *G06F 16/24568* (2019.01); *G06F 7/14* (2013.01)

(58) Field of Classification Search
CPC ................................................ G06F 16/24568
USPC ........................................................ 707/703
See application file for complete search history.

(56) References Cited

U.S. PATENT DOCUMENTS

| | | | |
|---|---|---|---|
| 2008/0288947 A1 | 11/2008 | Gokhale et al. | |
| 2012/0331106 A1 | 12/2012 | Ramamurthy et al. | |
| 2018/0332087 A1* | 11/2018 | Paduroiu | H04L 67/26 |
| 2018/0332088 A1* | 11/2018 | Kaitchuck | H04L 67/26 |

OTHER PUBLICATIONS

Pravega Concepts,"Pravega", URL:http://pravega.io/docs/latest/pravega-concepts/#autoscaling-the-number-of-streamsegments-can-vary-Over-time. Last Accessed Jan. 16, 2019. 21 pages.
GitHub, "Proposal for rolling transaction in Pravega", URL: https://github.com/pravega/pravega/wiki/PDP-24:-Rolling-Transaction, May 18, 2020, 12 pages.
Final Office Action received for U.S. Appl. No. 16/281,344 dated Jan. 21, 2021, 16 pages.
(Continued)

*Primary Examiner* — Chelcie L Daye
(74) *Attorney, Agent, or Firm* — Amin, Turocy & Watson, LLP

(57) ABSTRACT

Efficient rolling transactions for a data storage system is described herein. A method as described herein can include structuring, by a device operatively coupled to a processor, a data stream according to a first structure, the first structure comprising respective stream segments that are associated with respective first key ranges; writing, by the device, a transaction to the data stream, wherein the transaction comprises events arranged in a second structure that is distinct from the first structure, and wherein the second structure comprises respective transaction segments that are associated with respective second key ranges; and merging, by the device, respective ones of the transaction segments into respective ones of the stream segments, resulting in merged transaction segments, in response to the second key ranges of the respective merged transaction segments at least partially matching the first key ranges of the respective ones of the stream segments.

20 Claims, 9 Drawing Sheets

(56) References Cited

OTHER PUBLICATIONS

Wu, et al. "Scaling Distributed Computing System Resources Based on Load and Trend" U.S. Appl. No. 16/223,950, filed Dec. 18, 2018, 51 pages.

Non-Final Office Action received for U.S. Appl. No. 16/281,344 dated Jul. 10, 2020, 22 pages.

\* cited by examiner

EFFICIENT ROLLING TRANSACTIONS IN A DATA STORAGE SYSTEM

TECHNICAL FIELD

The subject application is related to data storage, and more particularly, to techniques for recording data in a data storage system.

BACKGROUND

As advancements in computing technology have increased the amount and scope of data that can be processed by a computing system, data storage systems have similarly seen significant advances to keep pace with the technical landscape. For instance, in addition to traditional storage systems that work on the basis of blocks, files, objects, and/or other similar data structures, stream-based data storage systems have been developed that implement data sequences called streams as a mechanism to store and/or serve continuous and potentially unbounded data.

A stream-based data storage system, or a "stream storage system," can be configured to dynamically and/or automatically partition streams into a number of parallel segments depending on the input/output (I/O) load the stream receives. In addition, data can be written to one or more streams associated with a data storage system in transactions and/or other suitable groupings of data. Similar to a stream itself, a transaction can also be partitioned into segments based on various factors.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a data stream component that maintains a data stream of a first structure, the first structure including respective stream segments that are associated with respective first key ranges. The executable components can also include a transaction processing component that commits a transaction to the data stream, where the transaction includes events arranged in a second structure that is distinct from the first structure, and the second structure includes respective transaction segments that are associated with respective second key ranges. The executable components can further include a merging component that merges respective ones of the transaction segments into respective ones of the stream segments, resulting in merged transaction segments, in response to the second key ranges of the respective merged transaction segments matching at least respective portions of the first key ranges of the respective ones of the stream segments.

In another aspect, a method is described herein. The method can include structuring, by a device operatively coupled to a processor, a data stream according to a first structure, the first structure including respective stream segments that are associated with respective first key ranges. The method can further include writing, by the device, a transaction to the data stream, where the transaction includes events arranged in a second structure that is distinct from the first structure, and where the second structure includes respective transaction segments that are associated with respective second key ranges. The method can additionally include merging, by the device, respective ones of the transaction segments into respective ones of the stream segments, resulting in merged transaction segments, in response to the second key ranges of the respective merged transaction segments at least partially matching the first key ranges of the respective ones of the stream segments.

In an additional aspect, a machine-readable medium including executable instructions is described herein. The instructions, when executed by a processor of a data storage system, can facilitate performance of operations including maintaining a data stream of a first structure, the first structure including respective first segments that are associated with respective first key ranges; committing a transaction to the data stream, where the transaction includes events arranged in a second structure that is distinct from the first structure, and where the second structure includes respective second segments that are associated with respective second key ranges; and merging respective ones of the second segments of the transaction into respective first segments of the data stream, resulting in merged second segments, in response to the second key ranges of the respective merged second segments matching at least respective portions of the first key ranges of the respective first segments.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Unlike conventional data storage systems that work with structures such as blocks, files, and objects, stream storage systems provide a new storage abstraction, referred to as a stream, for continuous and potentially unbounded data. As used herein, the term "stream" refers to a durable, elastic, append-only, unbounded sequence of data. Stated another way, a stream storage system implements streams as a first class primitive for storing and/or serving continuous and unbounded data.

In addition, data associated with a stream can be grouped within the stream into constructs referred to as events. By way of specific, non-limiting example, a blockchain ledger can be stored as a stream, where respective events in the stream correspond to individual contracts. As another example, data collected over time from sensors and/or other devices can be stored and/or maintained as a stream. In general, however, a stream can be utilized for the storage of any suitable unbounded data sequences.

In an aspect, a stream can be dynamically partitioned into a number of parallel segments, e.g., via an automatic process and/or manually, based on the I/O load of the stream and/or other factors. However, as stated above, this feature can complicate the implementation of transaction support since a transaction can also be partitioned into segments which may or may not conform to the same structure as the stream associated with the transaction. In particular, difficulties can arise in a scenario in which the transaction segments differ from the segments of an associated stream at the time the transaction is committed to the stream. Accordingly, it would be desirable to implement techniques that enable a transaction to be merged into a stream in an efficient manner, even in the case that the segment structure of the stream and the transaction differ.

Figure 1:
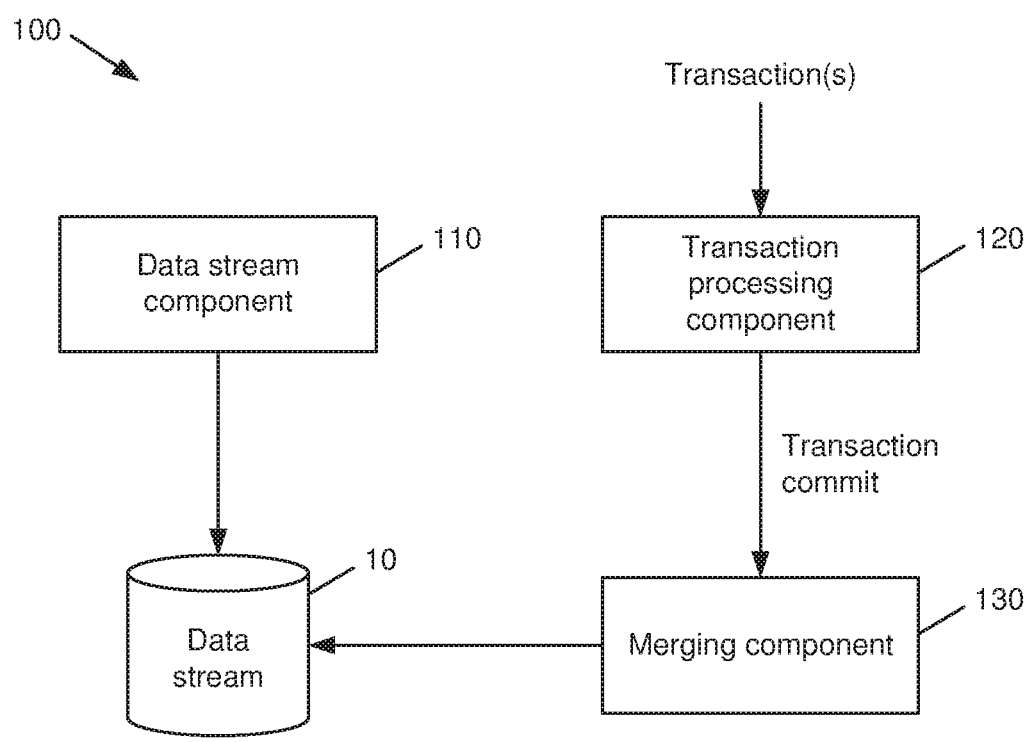
FIG. 1 is a block diagram of a system that efficient rolling transactions in a data storage system in accordance with various aspects described herein.

With reference now to the drawings, FIG. 1 illustrates a block diagram of a system 100 that facilitates efficient rolling transactions in a data storage system in accordance with various aspects described herein. As shown in FIG. 1, system 100 includes a data stream component 110 that maintains a data stream 10 according to a first structure. A data stream, also referred to herein as simply a stream, is a durable, elastic, append-only, unbounded sequence of data. In an aspect, data associated with a data stream can be grouped into structures referred to as events. In a further aspect, respective events can be associated with a routing key, which can be derived from data naturally occurring in the event, e.g., a machine identifier associated with one or more computing devices involved in creating the event, and/or other suitable information. The data stream component 110 can be further configured such that events with the same routing key are consumed in the order that they are written to the data stream 10.

In an aspect, the stream 10 can be split into a set of shards, partitions, and/or other subdivisions, which can be referred to herein as stream segments (or simply segments). The segments of the stream 10 can act as logical containers for events within the stream 10. For instance, when a new event is written to the stream 10, that event can be stored to one of the segments of the stream 10 based on the routing key associated with the event.

Figure 2:
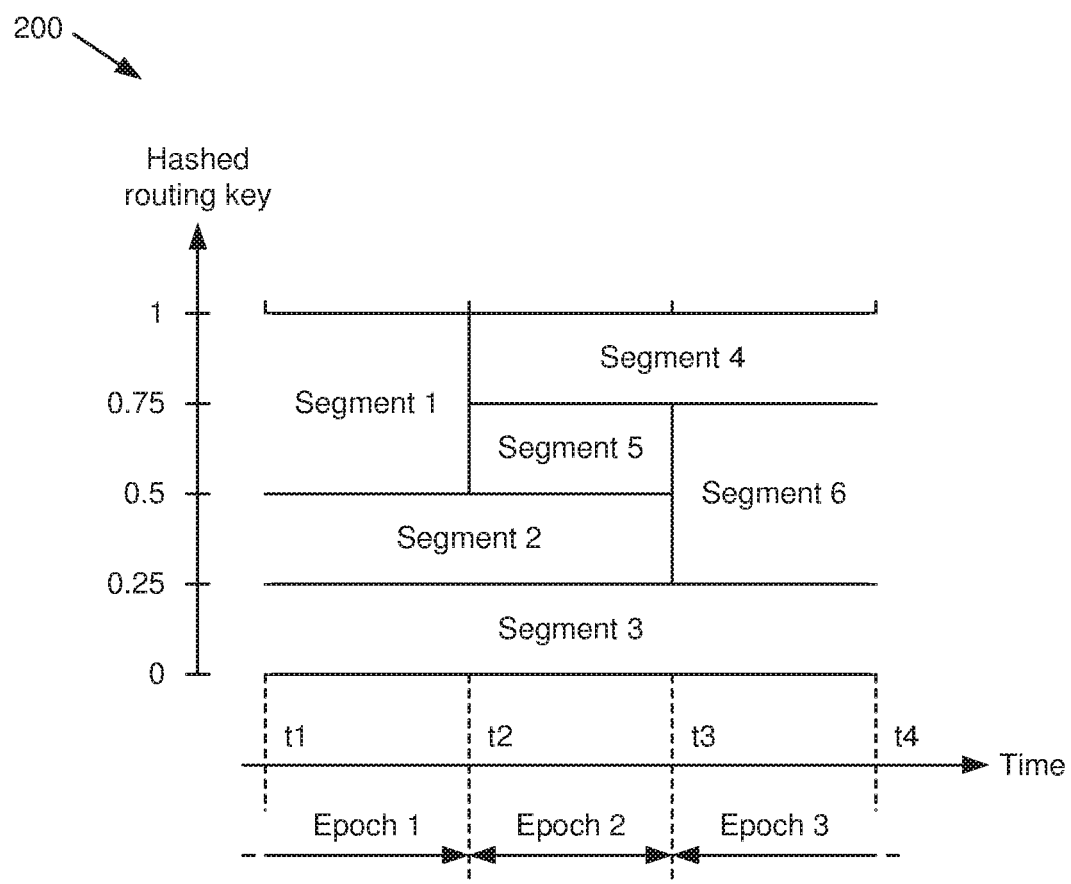
FIG. 2 is a diagram depicting an example stream structure that can be utilized in accordance with various aspects described herein.

In another aspect, event routing keys can be hashed to form a "key space." The key space can then be divided by the data stream component 110 into a number of partitions, e.g., corresponding to the number of segments of the stream 10. An example of a key space that can be utilized by the data stream component 110 is illustrated by diagram 200 in FIG. 2. As shown by diagram 200, a stream can be divided into a set of segments according to its associated key space. For instance, at time t1 as illustrated by diagram 200, a data stream can have a first stream segment associated with the key range from 0.5 to 1, a second stream segment associated with the key range from 0.25 to 0.5, and a third key range associated with the key range from 0 to 0.25.

As further shown by diagram 200, the number of parallel segments in a stream can be increased and/or decreased over time, e.g., via the data stream component 110, based on the I/O load received by the stream. In an aspect, the data stream component 110 can perform these adjustments automatically via a process referred to herein as auto scaling.

For instance, the example data stream shown by diagram 200 has three segments at time t1, referred to as segments 1, 2, and 3, respectively. Diagram 200 further illustrates that the rate of data written to the stream remains substantially steady until approximately time t2. At time t2, the data stream component 110 identifies an increase in the ingestion rate and splits segment 1 into two smaller segments, referred to in diagram 200 as segments 4 and 5. Further at time t2, segment 1 is sealed, e.g., such that it stops accepting events. Further, the hash function that maps routing keys to segments changes accordingly. In an aspect, the process of splitting segment 1 into two distinct segments at time t2 is referred to as a scale-up event. It should be appreciated that segments 2 and 3, which are unaffected by the scale-up event, can continue to accept the same ranges of events.

Next, at time t3, the data stream component 110 identifies a decrease in the ingestion rate and merges segments 2 and 5 into a single segment, referred to in diagram 200 as segment 6. Similar to the event at time t2, segments 2 and 5 are sealed at time t3 such that they stop accepting events, and the hash function that maps routing keys to segments changes accordingly. In an aspect, the process of merging segments 2 and 5 into a single segment at time t3 is referred to as a scale-down event. Similar to segments 2 and 3 following the scale-up event at time t2, segments 3 and 4, which are unaffected by the scale-down event, can continue to accept the same ranges of events.

In an aspect, a time interval between two successive scaling events is referred to as an epoch. In the example shown by diagram 200, there are three epochs: The first epoch starts at a time prior to time t1 (not shown in diagram 200) and ends at time t2, the second epoch starts at time t2 and ends at time t3, and the third epoch starts at time t3 and ends at some time in the future, e.g., on or after a time t4.

Returning to FIG. 1, system 100 further includes a transaction processing component 120 that can commit and/or otherwise write data to the data stream 10, e.g., as one or more transactions. In an aspect, data can be written to the data stream 10 as respective events and/or other defined units. A transaction, in turn, can be composed of a group of events that can be committed into the data stream 10 by the transaction processing component 120 as a unit, e.g., via a batch process and/or by other means.

Figure 4:
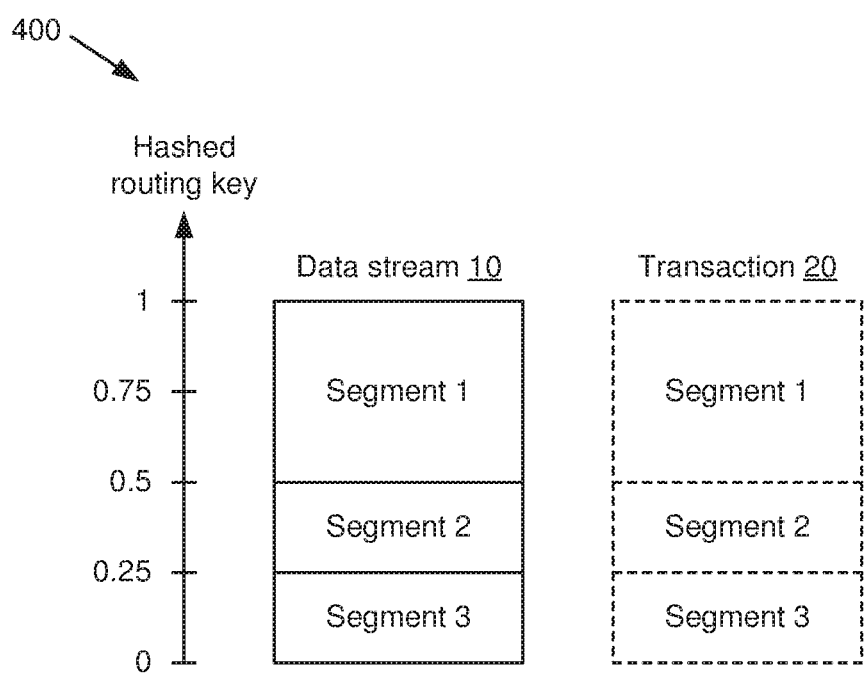
FIGS. 4-5 are diagrams depicting respective transaction structures that can be utilized in accordance with various aspects described herein.
Figure 5:
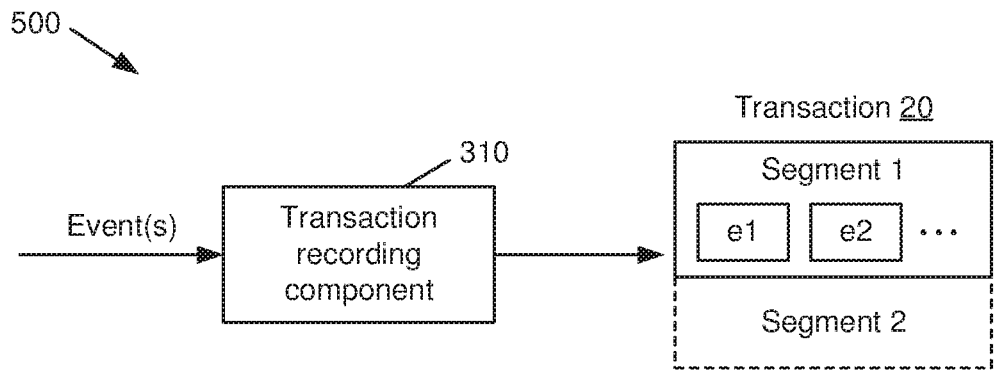

In an aspect, a transaction can mimic the structure of a stream, e.g., with multiple segments that are similar to those illustrated by diagram 200. When an event is written to a transaction, the event can be routed to a segment of the transaction. Once the transaction is committed, the transaction segments can be automatically appended to their corresponding stream segments of the parent stream. Conversely, if the transaction is aborted, the transaction, along with all of its segments and events, can be removed from the system. Techniques that can be utilized for structuring and writing events to a transaction are described in further detail below with respect to FIGS. 3-5.

However, difficulties can arise in the event that the structure of the data stream 10 and a transaction to be committed to the data stream 10 differ. More particularly, conventional data stream processing introduces an implicit relationship between stream segments and transaction segments. Thus, for example, if the data stream 10 has a first structure that includes stream segments associated with first key ranges and a transaction has a second, different structure that includes transaction segments associated with second key ranges, the transaction cannot be committed to the data stream 10 without performing further operations.

In some implementations, a difference in structure between a data stream and a transaction is handled by preventing epoch changes as shown by diagram 200 until all active transactions have either completed or aborted. As a result, active transactions can block scale-up and scale-down events in a system utilizing this implementation. In systems where new transactions are created regularly, this can lead to near total prevention of any stream scaling. In other implementations, a process referred to as a rolling transaction can be utilized, wherein a pair of epoch transitions is utilized to conform the structure of the stream to that of the transaction, i.e., a first epoch transition prior to committing the transaction to transition the stream structure to that of the transaction structure, and a second epoch transition after committing the transaction to return the stream to its previous structure. Rolling transactions are described in further detail below, e.g., with respect to FIGS. 9-10.

In an aspect, system 100 as shown in FIG. 1 further includes a merging component 130 that can merge respective transaction segments provided by the transaction processing component 120 into the data stream 10, without triggering an epoch transition and/or incurring other associated overhead, in response to the key ranges of the transaction segments at least partially matching key ranges associated with respective segments of the data stream 10. Stated another way, the merging component 130 can merge respective transaction segments into the data stream 10 in response to key ranges for those transaction segments matching at least respective portions of key ranges associated with segments of the data stream 10 while preserving the structure of the data stream 10 that was present prior to merging the transaction segments. As utilized herein, the term "merged transaction segment" refers to a segment of a transaction that is merged into the data stream 10 via the merging component 130 in the above manner.

By implementing transaction processing via system 100 in the manner described above, various advantages that can result in improvements to the performance of a computing system can be achieved. For instance, the resource cost (e.g., in terms of network bandwidth, processor cycles, power consumption, etc.) associated with conducting epoch transitions can be reduced. Further, resource costs associated with processing and/or committing transactions to a data stream can be reduced. Other advantages are also possible.

In an aspect, the term "writer" is used herein to describe a system or entity that writes data, e.g., data associated with events and/or transactions, to the data stream 10. Similarly, the term "reader" is used to describe a system or entity that reads data written to the data stream 10. In an aspect, two or more readers can be organized into a reader group, which is a named collection of readers that can operate together to perform parallel reads from a given stream. In an aspect, zero or more segments of a stream can be assigned to each reader in a reader group. In some embodiments, segments can be assigned to readers such that the respective readers are assigned to a substantially balanced amount of segments. Accordingly, applications associated with the data stream 10 can react on an epoch change (e.g., a scale-up or scale-down event as described above) via adding or removing readers from a given reader group as appropriate.

In another aspect, transactions are durable, e.g., transactions are guaranteed to survive once added to the data stream 10 unless or until said transactions are removed from the data stream 10. Additionally, events added to a transaction are durable once the events are acknowledged back to their writer. However, events in a transaction can be kept from visibility by readers until the transaction is committed by the writer.

Figure 3:
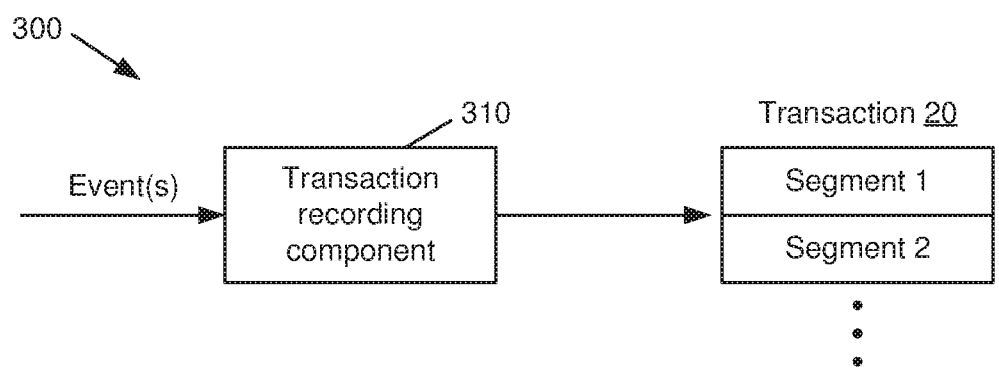
FIG. 3 is a block diagram of a system that facilitates creating and structuring a transaction for a stream storage system in accordance with various aspects described herein.

Referring now to FIG. 3, a block diagram of a system 300 that facilitates creating and structuring a transaction for a stream storage system in accordance with various aspects described herein is illustrated. Repetitive description of like elements employed in other embodiments described herein is omitted for brevity. As shown by FIG. 3, system 300 includes a transaction recording component 310 that can record events to a given transaction 20, e.g., in preparation for a transaction commit via the transaction processing component 120.

In an aspect, the transaction recording component 310 can structure a given transaction 20, e.g., with one or more segments, such that respective events can be assigned to respective segments of the transaction 20 according to one or more criteria. For example, as shown by diagram 400 in FIG. 4, the transaction recording component 310 can assign key ranges to respective transaction segments such that those key ranges match respective key ranges associated with segments of the data stream 10 to which the transaction 20 is to be committed. In an aspect, the transaction recording component 310 can structure a transaction 20 as shown by diagram 400 based on the structure of the data stream 10 at a time at which the transaction 20 and/or its corresponding segments are generated, and/or at any other suitable time.

In another aspect, the transaction recording component 310 implements transaction epochs as quasi-epochs where segments are created lazily. Stated another way, the transaction recording component 310 can create transaction segments for respective key space ranges in response to events being written to those segments. For instance, the transaction 20 shown in diagram 400 can be constructed such that none of the segments of the transaction 20 are generated until data are written to them. These conditionally created segments of the transaction 20 are shown in diagram 400 via dashed lines. In contrast, as shown by diagram 500 in FIG. 5, the transaction recording component 310 can create respective segments once one or more events are assigned to those segments. In the example shown by diagram 500, segment 1 of the transaction 20 can be created by the transaction recording component 310 in response to respective events, here two events e1 and e2, being assigned to segment 1.

With reference again to FIG. 1, an epoch transition is a complex operation that can imply several different sub-operations, such as sealing old segments, creating new segments, changing a mapping between reader group members and stream segments, potentially creating and/or deleting readers within reader groups, etc. When a large number of transactions commits after an epoch transition, a stream storage system may be tasked with going through a large number of epoch transitions, e.g., two per transaction commit as described above. In addition to impacting system reactivity and stability, excessive epoch transitions can also adversely impact batch reads of stream historical data and/or result in other adverse effects.

In view of the above, the merging component 130 can reduce a number of epoch transitions caused by rolling transactions by leveraging a property referred to herein as epoch compatibility between the data stream 10 and respective transactions. In an aspect, the merging component 130 can merge two epochs (e.g., a stream epoch and a transaction epoch) while preserving the structure of the data stream 10, even if the two epochs differ, provided said epochs are compatible. Accordingly, a rolling transaction (e.g., a transaction that crosses at least one border between epochs) can be committed without causing an epoch change under various circumstances. Epoch compatibility is described in further detail below.

In an aspect, the merging component 130 can perform analysis of two epochs, e.g., a current stream epoch and an epoch associated with a transaction, to determine when an epoch change can be replaced with a simple merge at the segment level. This determination can be based on information such as the hash functions associated with the two epochs, the amount of data within respective transaction segments corresponding to the transaction epoch, and/or other suitable information.

As noted above with respect to FIG. 2, a hash function associated with a data stream and/or transaction can be configured to not change completely during an epoch transition. Instead, scaling can be performed via either splitting a range of a key space into multiple key ranges (e.g., a scale-up event) or merging adjacent ranges into one range (e.g., a scale-down event). Accordingly, epochs can be regarded as a sequence of small changes to a hash function.

Based on the above, a determination as to whether a current stream epoch is compatible with a transaction epoch can be made without comparing sequence numbers of the two numbers to detect an epoch change. Instead, the merging component 130 can compare the ranges of a transaction that have segments (e.g., with events) that coincide with ranges of the current stream epoch. Based on this definition, a transaction epoch can be compatible with a current stream epoch, thereby permitting the merging component 130 to merge the transaction into the data stream without triggering an epoch change, when each transaction key range with data has a substantially exact copy within the current stream epoch.

Figure 6:
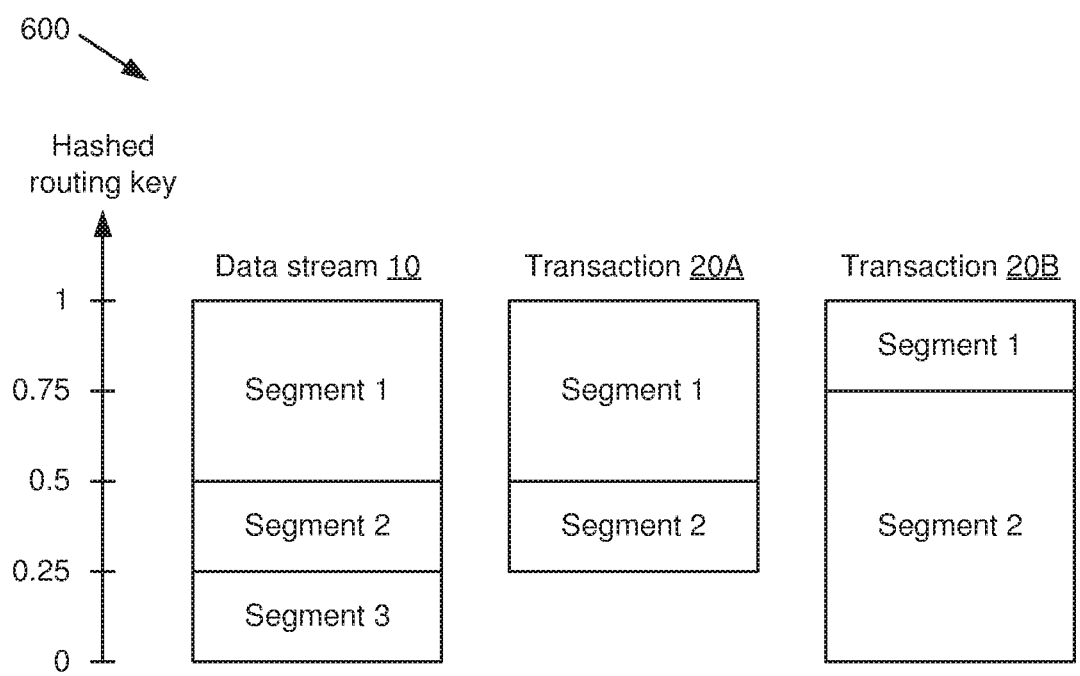
FIG. 6 is a diagram depicting compatibility between a data stream and respective transactions to be committed to the data stream in accordance with various aspects described herein.

Visual examples to illustrate the notion of epoch compatibility are shown by diagram 600 in FIG. 6. In the example shown by diagram 600, a current stream epoch is associated with three segments—a first segment occupying the key range from 0.5 to 1, a second segment occupying the key range from 0.25 to 0.5, and a third segment occupying the key range from 0 to 0.25. As further shown in diagram 600, a first transaction 20A has two segments that each match the key ranges of the first two stream segments. Because each of the segments of transaction 20A are associated with key ranges that match key ranges associated with segments of the current stream epoch, transaction 20A is compatible with the current epoch of the data stream 10. While transaction 20A does not contain segments that occupy the entire key range from 0 to 1, e.g., due to there being no events in transaction 20A that correspond to the unused key ranges, transaction 20A is nonetheless compatible with the current stream epoch because each of its existing segments are compatible with the stream epoch. In contrast, a second transaction 20B shown in diagram 600 is composed of two segments having key ranges that do not match the respective key ranges for the segments of the current stream epoch. As a result, transaction 20B is not compatible with the current stream epoch.

To generalize the examples shown by diagram 600, epoch compatibility can be leveraged by the merging component 130 to perform optimized merging operations in at least two cases. The first such case includes scenarios in which a transaction works only with a part of the key ranges associated with the data stream, e.g., as shown by transaction 20A in diagram 600, and the corresponding ranges have not been changed after the transaction was created. The second case includes cases in which the data stream has undergone two or more epoch transitions and the current epoch uses the same hash function as the epoch that existed at the time the transaction was created, which can occur in a scenario in which the stream epoch changes quasi-cyclically and a transaction is kept alive for a complete cycle. Other cases that exhibit epoch compatibility could be used.

Figure 7:
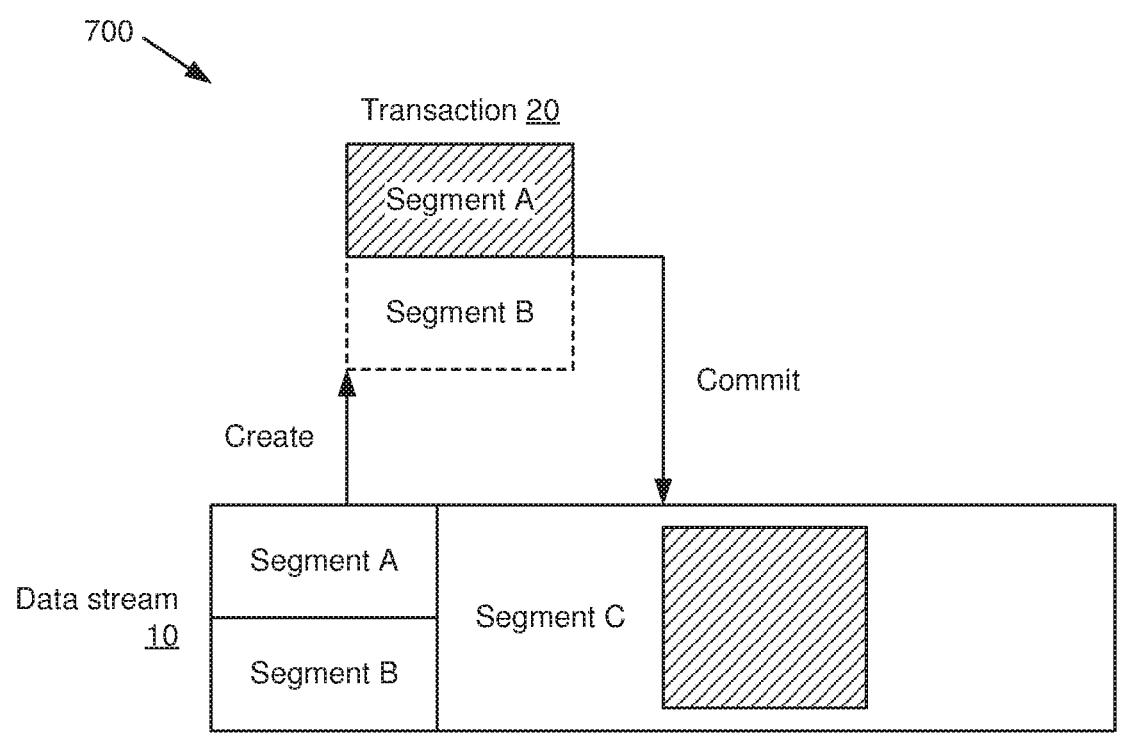
FIGS. 7-8 are diagrams depicting example segment merging operations that can be utilized in accordance with various aspects described herein.

In an aspect, the merging component 130 can merge one or more transaction segments into a given stream segment in some cases even in the absence of an exact one-to-one match between the transaction segments and the corresponding stream segments, e.g., if the key ranges for the transaction segments to be merged match at least a portion of the target stream segment, such as a portion that includes less than all of the complete key range associated with the target stream segment. By way of a first non-limiting example shown by diagram 700 in FIG. 7, a stream epoch can be configured with two ranges/segments, shown in diagram 700 as segments A and B, at the time a transaction is created. It should be appreciated that the stream epoch can include more than these two segments without altering the operations shown by diagram 700. The transaction epoch subsequently inherits segments A and B, but in the example shown by diagram 700 a transaction segment and corresponding events are created only for transaction segment A. As further shown by diagram 700, the parent stream unites segments A and B into a single segment C, e.g., via a scale-down event, before the transaction commits In this scenario, the merging component 130 can merge transaction segment A into stream segment C despite the epoch change in order to avoid an epoch transition at the time of transaction commit.

Figure 8:
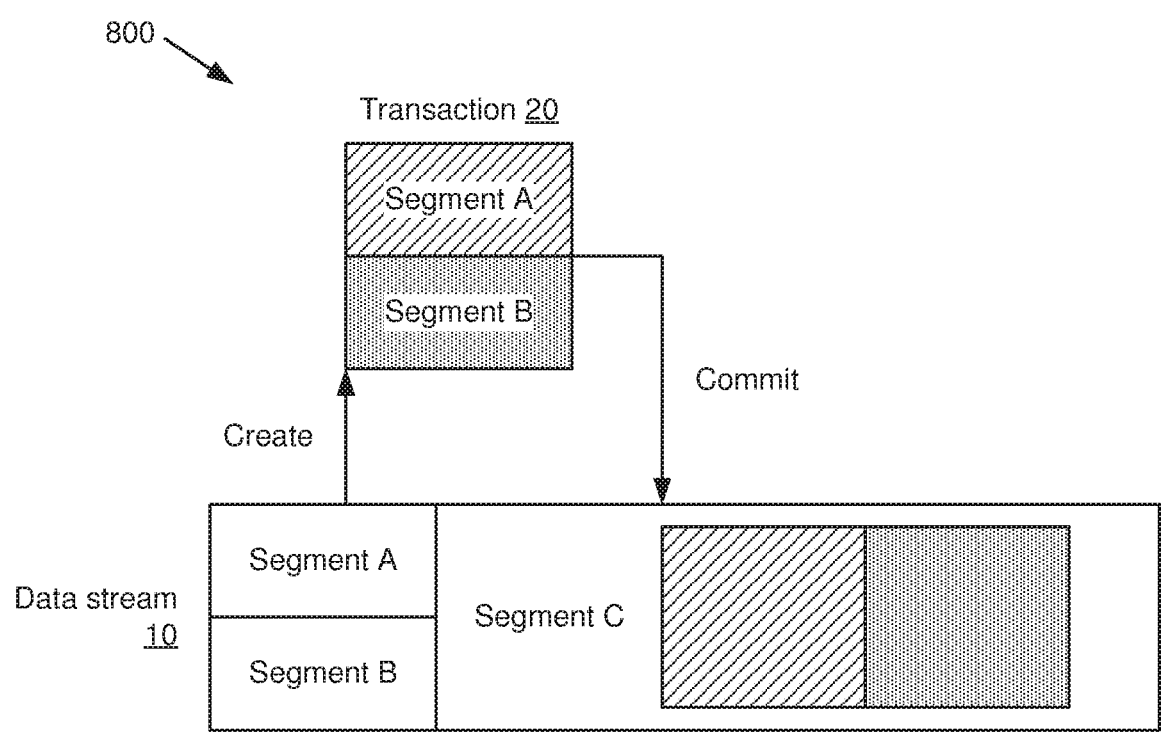

In a further aspect as illustrated by diagram 800 in FIG. 8, the above technique can be extended to a case in which a transaction 20 creates both segments A and B and assigns events to each segment. More particularly, in a system that is configured to provide for correct event ordering only on the level of routing key values and is further configured to prohibit two events with the same routing key value from going to two different transaction segments, transaction segments A and B can be merged into segment C consecutively as shown by diagram 800. In one example, transaction segments A and B can be merged into stream segment C as shown by diagram 800 in the order they were created (e.g., in the order in which the transaction segments received their first events); however, the transaction segments can be merged into the stream segment in any suitable order.

In an aspect, the segment merging technique illustrated by diagram 800 can be utilized for systems that do not enforce cross routing key ordering. To reduce the impact of potential out-of-order delivery of events on respective applications, an application can specify a threshold on transaction segment size (e.g., in terms of number of events, data size, etc.), transaction, and/or other factors, such that the merging operations as shown by diagram 800 can be performed when each of the transaction segments to be merged fall below the application-defined thresholds. When at least one transaction segment is above such a threshold, the system can fall back to creation of a separate stream epoch for the transaction.

In an aspect, a transaction segment can be merged into a stream segment using the techniques described above, e.g., by the merging component, when the transaction segment is compatible with the stream segment. Stated another way, a transaction epoch is compatible with its parent stream's current epoch when each created segment of the transaction (e.g., each segment to which events are assigned, as shown above in diagram 500) is compatible with one of the stream segments. When an epoch of a transaction is compatible with a current epoch of a parent stream, the transaction can be committed using the techniques described above without an epoch change.

Figure 9:
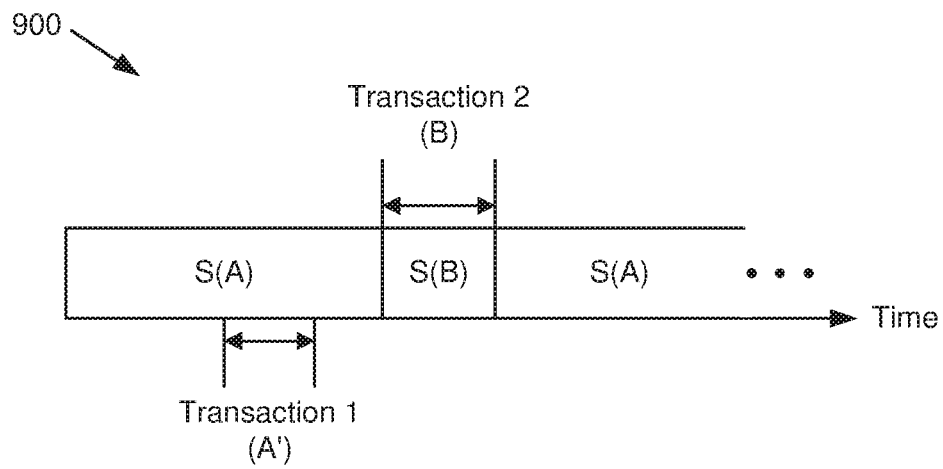
FIGS. 9-10 are diagrams depicting respective example rolling transactions that can be utilized to record transactions to a data stream in accordance with various aspects described herein.
Figure 10:
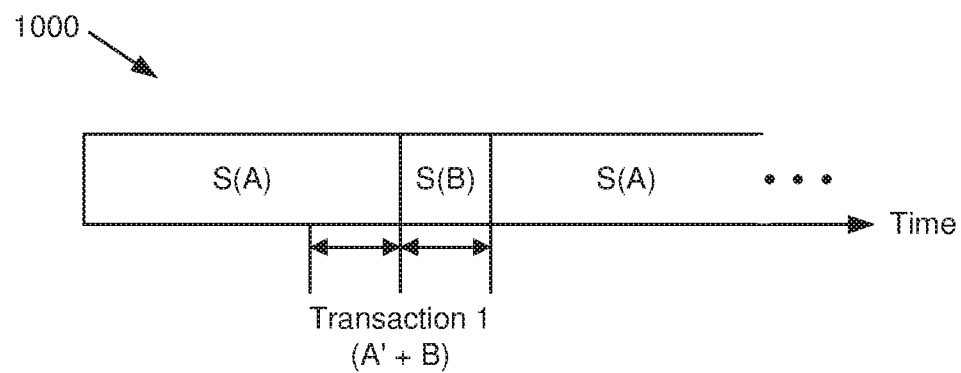

Alternatively, if a transaction is not compatible with the current stream epoch, the transaction can be merged into the stream using a rolling transaction, as shown by diagram 900 in FIG. 9. As shown in diagram 900, an initial stream epoch is denoted as epoch A. During the initial epoch A, a first transaction A' that is fully compatible with stream epoch A is committed and merged into the stream, e.g., using one or more techniques as described above. Subsequently, a second transaction B that is not compatible with stream epoch A is committed. In response, the transaction segments of transaction B are promoted to stream segments, and the new stream segments are appended to the stream as an epoch of the transaction size. This is depicted in diagram 900 as a new stream epoch B. After the incompatible transaction is merged into the stream, the previous stream epoch, e.g., stream epoch A, can be recommenced.

In another aspect, a transaction epoch can also be partially compatible with its parent stream's current epoch, e.g., when at least one created transaction segment is compatible with a stream segment and at least one other created transaction segment is not compatible with any stream segments. When an epoch of a transaction is partially compatible with a current epoch of its parent stream, the transaction can be merged into the stream as shown by diagram 1000 in FIG. 10. As shown by diagram 1000, a transaction that is partially compatible with the initial stream epoch A is denoted as A'+B, where A' denotes the segment(s) of the transaction that are compatible with stream epoch A and B denotes the segment(s) of the transaction that are not compatible with stream epoch A. Here, the compatible transaction segments can be merged into the stream without causing an epoch change according to one or more techniques as described above, and an epoch change can be performed for only the incompatible transaction segments B. By merging at least a portion of the transaction segments under stream epoch A rather than creating a new epoch for all segments, the number of stream segments to be sealed and/or created can be reduced, which in turn can reduce the impact on reader groups and/or other entities associated with the data stream.

Figure 11:
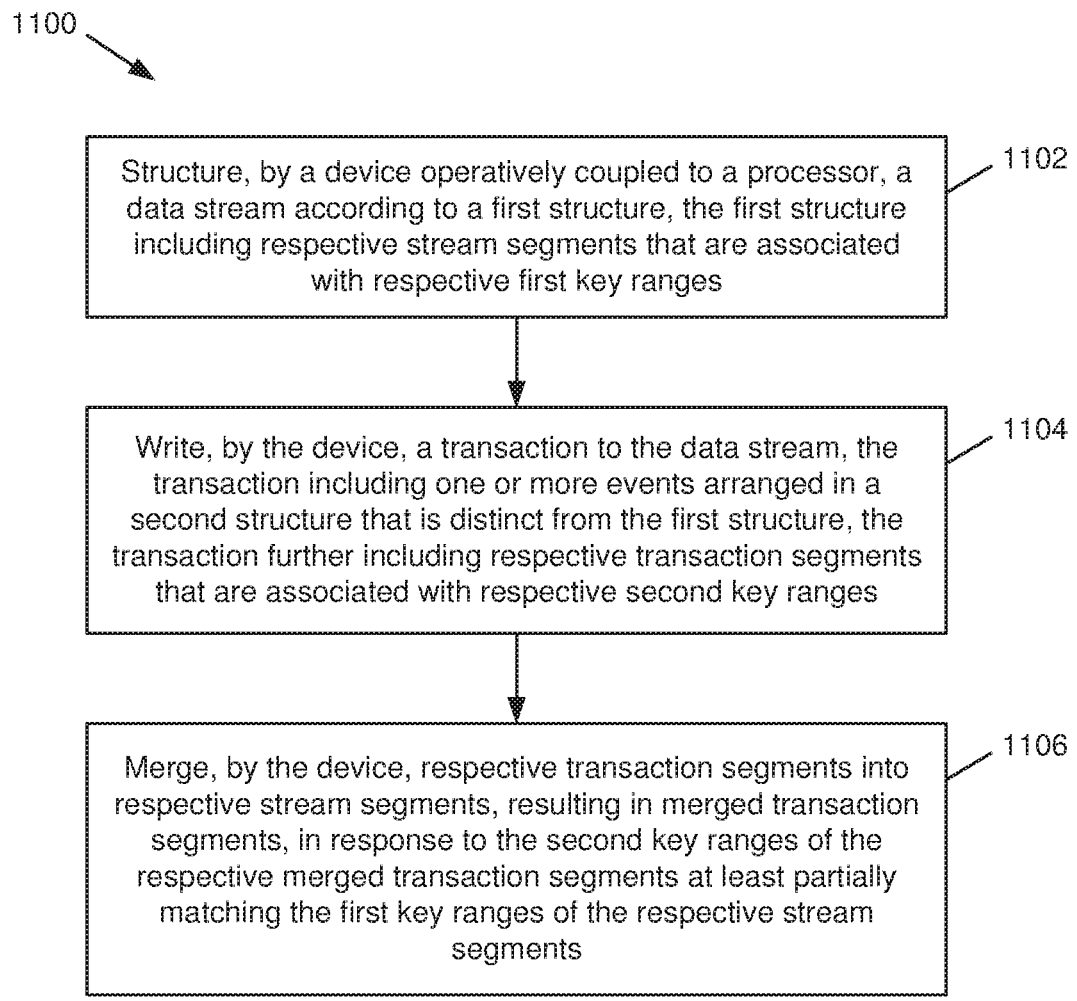
FIG. 11 is a flow diagram of a method that facilitates efficient rolling transactions in a data storage system in accordance with various aspects described herein.

Referring next to FIG. 11, a flow diagram of a method 1100 that facilitates efficient rolling transactions in a data storage system in accordance with various aspects described herein is illustrated. At 1102, a device operatively coupled to a processor can structure (e.g., by a data stream component 110) a data stream (e.g., a data stream 10) according to a first structure, which in turn can include respective stream segments that are associated with respective first key ranges.

At 1104, the device can write (e.g., by a transaction processing component 120) a transaction (e.g., a transaction 20) to the data stream. The transaction at 1104 can include one or more events arranged in a second structure that includes respective transaction segments that are associated with respective second key ranges. In an aspect, the second structure associated with the transaction can be at least partially distinct from the first structure of the data stream, e.g., in terms of present segments, key ranges associated with respective segments, or the like.

At 1106, the device can merge (e.g., by the merging component 130) respective transaction segments into the respective stream segments, resulting in merged transaction segments, in response to the second key ranges of the respective merged transaction segments at least partially matching the first key ranges of the respective stream segments. In other words, transaction segments that are compatible with respective stream segments according to the definitions provided above can be merged into the stream at 1106.

FIG. 11 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
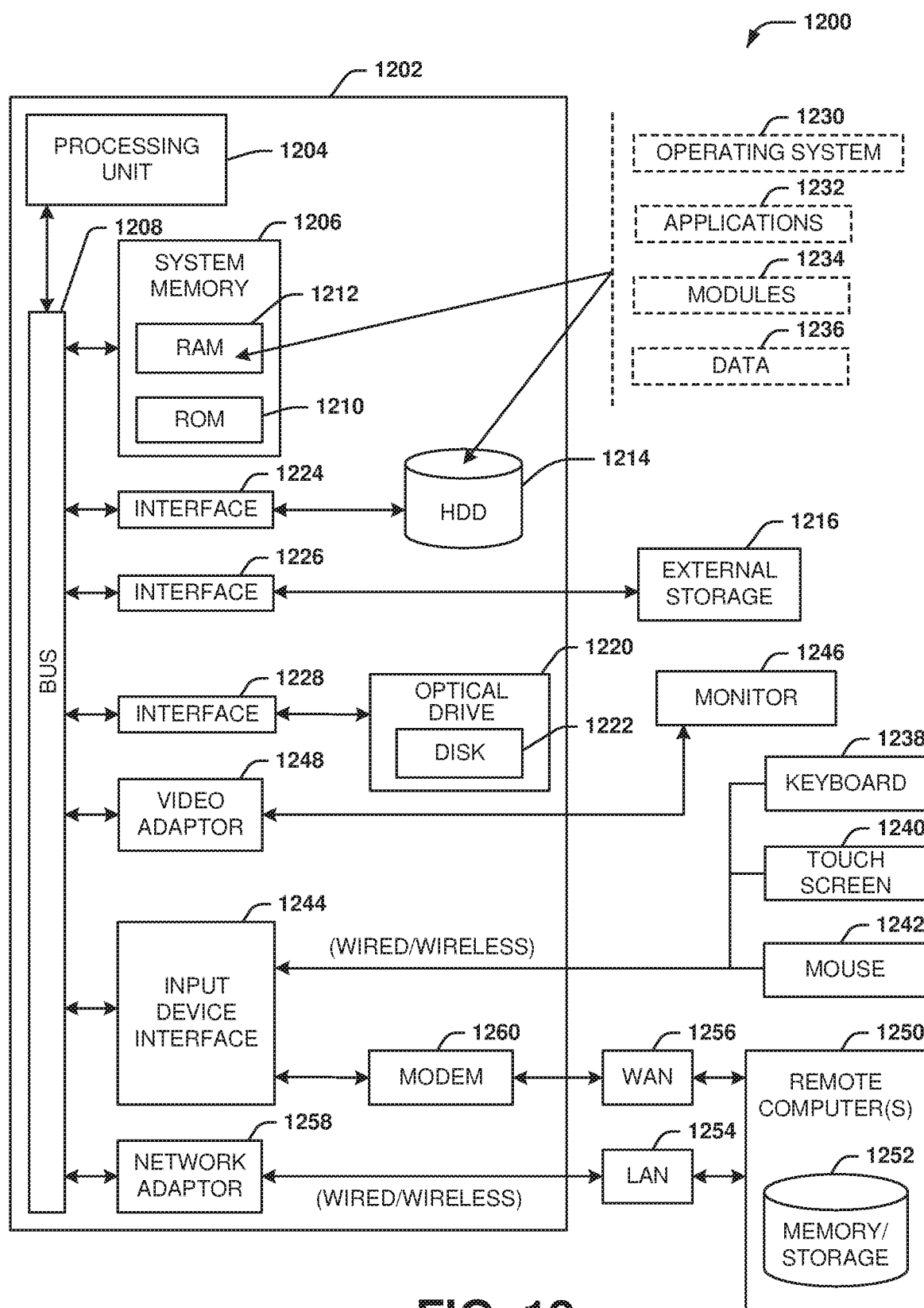
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
      a data stream component that maintains a data stream of a first structure, the first structure comprising respective stream segments that are associated with respective first key ranges;
      a transaction processing component that commits a transaction to the data stream, wherein the transaction comprises events arranged in a second structure that is distinct from the first structure, the second structure comprising respective transaction segments that are associated with respective second key ranges; and
      a merging component that merges respective ones of the transaction segments into respective ones of the stream segments, resulting in merged transaction segments, in response to the second key ranges of the respective merged transaction segments matching at least respective portions of the first key ranges of the respective ones of the stream segments, wherein the merging component merges a first one of the transaction segments into a first one of the stream segments in response to a first one of the second key ranges, for the first one of the transaction segments, matching a first portion of a first key range, for the first one of the stream segments, and wherein the first portion of the first key range comprises less than all of the first key range.

2. The data storage system of claim 1, wherein the merging component merges the merged transaction segments into the data stream while preserving the first structure of the data stream.

3. The data storage system of claim 1, wherein the computer executable components further comprise:
   a transaction recording component that records the events to the transaction, wherein the transaction recording component generates respective ones of the transaction segments in response to respective ones of the events being assigned to the respective ones of the transaction segments.

4. The data storage system of claim 3, wherein the transaction recording component assigns the second key ranges to the respective transaction segments such that the second key ranges match respective ones of the first key ranges associated with the data stream at a time at which the respective transaction segments are generated.

5. The data storage system of claim 1, wherein the merging component further merges a second one of the transaction segments into the first one of the stream segments in response to a second one of the second key ranges for the second one of the transaction segments matching a second portion of the first key range for the first one of the stream segments that comprises less than all of the first key range.

6. The data storage system of claim 5, wherein the merging component further merges the second one of the transaction segments into the first one of the stream segments further in response to the second one of the transaction segments comprising less than a threshold number of events.

7. The data storage system of claim 1, wherein the transaction comprises one or more unmerged transaction segments having second key ranges that are distinct from the first key ranges of the respective stream segments, and wherein the merging component alters the first structure of the data stream to the second structure and merges the one or more unmerged transaction segments into the data stream according to the second structure.

8. The data storage system of claim 7, wherein the merging component returns the data stream to the first structure in response to merging the one or more unmerged transaction segments into the data stream.

9. A method, comprising:
   structuring, by a device operatively coupled to a processor, a data stream according to a first structure, the first structure comprising respective stream segments that are associated with respective first key ranges;
   writing, by the device, a transaction to the data stream, wherein the transaction comprises events arranged in a second structure that is distinct from the first structure, and wherein the second structure comprises respective transaction segments that are associated with respective second key ranges; and
   merging, by the device, respective ones of the transaction segments into respective ones of the stream segments, resulting in merged transaction segments, in response to the second key ranges of the respective merged transaction segments at least partially matching the first key ranges of the respective ones of the stream segments, wherein the merging comprises merging a first one of the transaction segments into a first one of the stream segments in response to a first one of the second key ranges, for the first one of the transaction segments, matching a first portion of a first key range, for the first one of the stream segments, and wherein the first portion of the first key range comprises less than all of the first key range.

10. The method of claim 9, wherein the merging comprises merging the merged transaction segments into the data stream while preserving the first structure of the data stream.

11. The method of claim 9, further comprising:
recording, by the device, the events to the transaction; and
generating, by the device, respective ones of the transaction segments in response to respective ones of the events being assigned to the respective ones of the transaction segments.

12. The method of claim 11, further comprising:
assigning, by the device, the second key ranges to the respective transaction segments such that the second key ranges match respective ones of the first key ranges associated with the data stream at a time of the generating the respective ones of the transaction segments.

13. The method of claim 9, wherein the merging further comprises merging a second one of the transaction segments into the first one of the stream segments in response to a second one of the second key ranges for the second one of the transaction segments matching a second portion of the first key range for the first one of the stream segments that comprises less than all of the first key range.

14. A non-transitory machine-readable medium comprising computer executable instructions that, when executed by a processor of a data storage system, facilitate performance of operations, the operations comprising:
maintaining a data stream of a first structure, the first structure comprising respective first segments that are associated with respective first key ranges;
committing a transaction to the data stream, wherein the transaction comprises events arranged in a second structure that is distinct from the first structure, and wherein the second structure comprises respective second segments that are associated with respective second key ranges; and
merging respective ones of the second segments of the transaction into respective ones of the first segments of the data stream, resulting in merged second segments, in response to the second key ranges of the respective merged second segments matching at least respective portions of the first key ranges of the respective ones of the first segments, wherein the merging comprises merging a first one of the second segments of the transaction into a first one of the first segments of the data stream in response to a first one of the second key ranges, for the first one of the second segments, matching a first portion of a first key range, for the first one of the first segments, and wherein the first portion of the first key range comprises less than all of the first key range.

15. The non-transitory machine-readable medium of claim 14, wherein the operations further comprise:
merging the merged second segments into the data stream while preserving the first structure of the data stream.

16. The non-transitory machine-readable medium of claim 14, wherein the operations further comprise:
recording the events to the transaction; and
generating respective ones of the second segments in response to respective ones of the events being assigned to the respective ones of the second segments.

17. The non-transitory machine-readable medium of claim 14, wherein the operations further comprise:
merging a second one of the second segments of the transaction into the first one of the first segments of the data stream in response to a second one of the second key ranges for the second one of the second segments matching a second portion of the first key range for the first one of the first segments that comprises less than all of the first key range.

18. The data storage system of claim 1, wherein a first number of the respective transaction segments is less than a second number of the respective stream segments.

19. The data storage system of claim 18, wherein the merging component compares the second key ranges of the respective transaction segments to the first key ranges of the respective stream segments, and wherein the merging component merges each of the respective transaction segments into the respective ones of the stream segments in response to determining that each of the second key ranges of the respective transaction segments coincides with corresponding first key ranges of the respective stream segments.

20. The method of claim 9, wherein a first amount of the respective transaction segments is less than a second amount of the respective stream segments, and wherein the method further comprises:
comparing, by the device, the second key ranges of the respective transaction segments to the first key ranges of the respective stream segments, wherein the merging comprises merging all of the respective transaction segments into the respective ones of the stream segments in response to all of the second key ranges of the respective transaction segments coinciding with respective ones of the first key ranges of the first stream segments.

* * * * *